| | | |
|---|---|---|
| United States Patent [19] | [11] | 4,148,753 |
| Sarjeant | [45] | Apr. 10, 1979 |

[54] NEUTRALIZATION OF PHOSPHORIC ACID ACTIVATED CARBON

[75] Inventor: Peter T. Sarjeant, Covington, Va.

[73] Assignee: Westvaco Corporation, New York, N.Y.

[21] Appl. No.: 857,240

[22] Filed: Dec. 5, 1977

[51] Int. Cl.$^2$ .................. C01B 31/12; B01J 21/18
[52] U.S. Cl. ..................... 252/423; 127/55; 252/422; 252/425; 252/447
[58] Field of Search ............... 252/423, 425, 447, 445, 252/444, 422; 423/460, 461; 127/55

[56] References Cited

U.S. PATENT DOCUMENTS

| | | | |
|---|---|---|---|
| 1,778,343 | 10/1930 | Urbain | 252/445 |
| 1,819,165 | 8/1931 | Hass | 252/443 |
| 1,875,795 | 9/1932 | Zurcher | 252/445 |
| 1,903,834 | 4/1933 | Oberle | 252/445 |
| 1,968,847 | 8/1934 | Morrell | 252/445 |
| 2,008,148 | 7/1935 | Morrell | 252/445 |
| 2,198,380 | 4/1940 | Ellis | 252/423 |
| 2,198,393 | 4/1940 | Smit | 127/55 |
| 2,464,902 | 3/1949 | Barton | 252/445 |
| 3,767,592 | 10/1973 | Kwok et al. | 252/445 |
| 3,835,064 | 9/1974 | Shimomiya et al. | 252/423 |
| 3,950,267 | 4/1976 | Arakawa | 252/425 |

FOREIGN PATENT DOCUMENTS 285386  2/1928  United Kingdom ............ 252/444

Primary Examiner—Winston A. Douglas
Assistant Examiner—P. E. Konopka
Attorney, Agent, or Firm—W. Allen Marcontell; Ernest B. Lipscomb III

[57] ABSTRACT

Cellulosic carbon that has been activated by a phosphoric acid process, is acid neutralized by contacting the carbon with an aqueous suspension of an additive material comprising a metal oxide or hydroxide of aluminum, zinc, or one of the alkaline earth elements to bind residual acid on the carbon in the form of a substantially insoluble phosphate salt.

12 Claims, No Drawings

NEUTRALIZATION OF PHOSPHORIC ACID ACTIVATED CARBON

BACKGROUND OF THE INVENTION

1. Field of the Invention

The present invention relates to the method of neutralizing the residual acidity of phosphoric acid activated carbon derived from cellulosic materials, such as sawdust, ground wood, pulp and bark.

2. Description of the Prior Art

One of several alternative processes for the manufacture of activated carbon from particulate materials comprises the step of combining phosphoric acid with the raw material furnish prior to activation. U.S. Pat. Nos. 1,778,343; 1,875,795; 1,903,834; 1,968,847; 2,008,148; and 3,767,592 are representative disclosures of techniques for activating carbon with phosphorous compounds.

Subsequent to activation, the predominate portion of residual acid is washed from the carbon with fresh water. An economic wash consistent with cyclic recovery of the dissolved acid removes most of the acid except for approximately 5% to 10% titratable $H_3PO_4$ as a weight percentage of the carbon. Washing, as the term is used herein, describes that process by which phosphate compounds, most of which are phosphoric acid, on the activated carbon surfaces, are dissolved or otherwise combined with a water flow around the carbon surfaces to be carried away therewith.

For most applications of activated carbon, the foregoing washing step is more than adequate. However, since the water solubility of the residual phosphoric acid is high, aqueous slurries of the carbon product have low pH values. Moreover, when the carbon is used to clarify food products such as corn syrup and sugar liquor, there is evidence to suggest that water soluble phosphate compounds e.g. phosphoric acid, are leached from the carbon into the product. As a result, 0.10 to 10.0 $\mu$ sized particles are precipitated in the flow stream to cloud the syrup or liquor with a colloidal haze. Although these particulates are insufficient to toxically contaminate the foods treated thereby, the resultant haze defeats the clarification objective of the carbon adsorption step.

It has been determined experimentally that to maintain a 98% clarity in corn syrup and sugar liquor, the maximum quantity of soluble phosphoric acid tolerably present in the carbon is 2% of the carbon weight.

It is, therefore, an object of the present invention to provide a method whereby the residual phosphoric acid found on or interstitially within acid activated carbon pores may be neutralized by conversion to substantially water insoluble compounds. In this context, substantially insoluble shall mean a solubility of less than 2 gms/100 ml of water.

Another object of the present invention is to increase the pH of phosphoric acid activated carbon without resort to soluble buffers such as sodium carbonate.

Another object of the present invention is to bind residual phosphate ion remaining in carbon following activation to and interstitially within the carbon pores in the form of insoluble ash. In this respect, the term bind is used to describe the solid nature of resultant insoluble phosphate compounds and the security of such compounds to remain mechanically or adhesively attached to and within the pore matrix of a carbon particle.

Another object of the present invention is to accomplish the foregoing objects in a procedurally direct and simple manner utilizing commonly available, inexpensive reaction compounds.

SUMMARY OF THE INVENTION

These and other objects of the invention may be achieved by washing cellulosically derived carbon, following a phosphoric acid activation treatment, with an aqueous suspension of oxides or hydroxide of Group II-A alkaline earth elements such as $CaO$, $Ca(OH)_2$, $MgO$, $Mg(OH)_2$, $SrO$, $Sr(OH)_2$, $BaO$, and $Ba(OH)_2$. Aluminum and zinc oxides and hydroxides may also be used. These compounds react with the residual phosphoric acid found in the carbon pores and bind the reaction product in situ to the carbon as a substantially water insoluble salt.

BRIEF DESCRIPTION OF THE PREFERRED EMBODIMENTS

In the production of activated carbon, a suitable granulated cellulosic source material such as sawdust, ground wood, pulp or bark is saturated with phosphoric acid and heated to 800° F. to 1100° F. for approximately 15 minutes to 1 hour in an activation furnace to drive off volatiles.

Granulation sizes for such materials are primarily limited by the available processing equipment such as pre-soaking tankage and dewatering devices but in the practical sense, range from 2 to 40 Tyler mesh (7 mm to 0.385 mm).

Following furnace activation, the carbon is slurried into a first wash tank with a mildly acidic water solution derived from the final extractive use of a counterflow secondary wash stream. From the first wash tank, the carbon is mechanically deposited into a traveling series of screen-bottomed trays for batch carriage under a series of increasingly pure water shower sprays. Drainage water from the final shower supplies the next preceding shower etc. until the first shower drainage is directed into the first wash tank. Solution drawn from the first wash tank is evaporatively concentrated for acid recovery and recycle.

At the end of the shower series, the trays dump their wash carbon contents into a second, mechanically agitated tank where it is further slurried in pure water.

From the second tank, the carbon is drained of water and transported into a gas or oil fired continuous drying kiln. Carbon and gas flow within the kiln are co-current, the carbon entering at ambient temperature and the gas entering at 2000° F. Transit time through the kiln is approximately 30 minutes. Both, carbon and gas, are approximately 400° F. at the kiln exit.

Within the commercial constraints of phosphoric acid recovery for reuse by evaporative concentration, such washing leaves approximately 5%–10% titratable acid in the carbon as measured on a carbon weight basis. This 5%–10% residual acid constitutes a source of low pH in aqueous uses of the carbon. Some adsorptive processes permit pH neutralization with a compatible base compound such as $Na_2CO_3$ or $Na(OH)_2$. In other adsorptive processes, such as syrup and sugar liquor clarification, the residual phosphate ion evidently reacts with cationic materials in the sugar to form colloidal sized precipitates thereby contaminating the desired product.

Pursuant to the present invention, it has been discovered that by contacting the carbon with an aqueous suspension of an oxide or hydroxide of a Group II-A element or of aluminum or zinc the residual phosphoric acid is bound to the carbon in the form of relatively water insoluble salt. The following formulations describe the reactions of such suitable metal oxides and hydroxides with phosphoric acid.

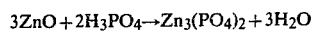

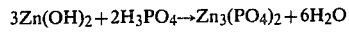

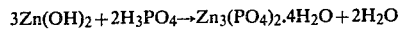

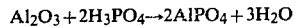

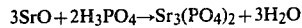

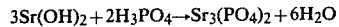

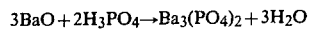

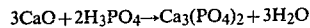

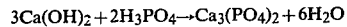

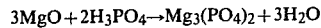

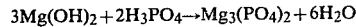

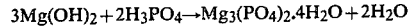

Those familiar with the art will recognize that some of the above formulative descriptions of these reactions are merely convenient generalizations of a complex reaction series in which the total metal and phosphate ion is distributed in various proportions among numerous intermediate salts.

Review of standard solubility tables such as those in *The Handbook Of Chemistry And Physics*, 53rd Ed., The Chemical Rubber Co., 1973 pg. B-63 will reveal that the additive compounds described as suitable for the invention and the corresponding phosphate salts have extremely low solubilities. CaO has a solubility of 0.131 gm/100 ml whereas $Ca(PO_4)_2$ has a solubility of 0.002 gm/100 ml. However, some of the intermediate compounds formed in the reaction progression to a stable salt are more soluble. For example, $Ca(H_2PO_4) \cdot H_2O$ has a solubility of 1.8 gm/100 ml. Nevertheless, by comparison to $H_3PO_4$ which has a solubility of 548 gm/100 ml, even $Ca(H_2PO_4) \cdot H_2O$ is relatively insoluble. Accordingly, for the purposes herein, relatively insoluble salt shall mean a solubility of less than 2 gms/100 ml.

The foregoing solubility discussion and definition also relates to the procedural practice of the invention. Since the described additive metal oxides and hydroxides are relatively insoluble, appropriate quantities of the selected compound are merely slurried in an aqueous mixture or suspension. Preferably, the appropriate amount of additive will be determined on the basis of a stoichiometric balance with the quantity of acid present on the carbon or of desired neutralization. However, as the data of Tables I and II will reveal, any quantity of the additive compound will further the desired objectives although the economic returns from the invention diminish with additive quantities greater than the stoichiometric balance.

As described above, the selected metal oxide or hydroxide additive is contacted with the carbon following the normal primary, post-activation, acid washing step. Within the aforedescribed flow stream, hydrated lime $[Ca(OH)_2]$ may be slurried with the pure wash water in the second wash tank as a fluidized mixture. Such wash water is supplied to the tank continuously as required by liquid tank level controls. Since a close correlation exists between the wash water pH and the quantity of acid remaining on the carbon at these concentration levels, continuous control over the flow rate of an additive lime stream may be effected from pH measurements at the exit fluid flow point of the tank. A representative lime control setpoint pH may be in the order of 5.5 to 6.0.

Although the additive could be combined with the acidic carbon direct from the activation furnace, there are several undesirable consequences from this procedure. First, a greater quantity of the additive is required to reach the same level of purity. Secondly, phosphoric acid is an expensive compound for large scale use in the manufacture of commercial products. Accordingly, it is extremely important to the economics of the process that a relatively high level of acid recovery efficiency be maintained. Should a significant percentage of the otherwise recoverable and recycleable acid be lost, for whatever reason, such recovery efficiency will suffer accordingly. Conversion of phosphate ion to insoluble salts prior to the final wash effects such losses and, therefore, reduced recovery efficiency.

In addition to the foregoing, precipitation of the insoluble salts in the recovery flow stream tends to obstruct flow lines and equipment operations.

Tables I and II present data obtained from laboratory evaluations of the invention utilizing CaO and $Ca(OH)_2$ as the neutralizing additive. Corresponding evaluations of MgO, $Mg(OH)_2$ and $Al_2O_3$ provide data shown by Table III sufficiently similar to that of Tables I and II to conclude insignificant differences. Due to the economics of compounding the Ca additives from lime, however, this element will normally be preferred.

TABLE I

| 20.0 grams Carbon Comprising 5.87% $H_3PO_4$ Treated With CaO Slurried In 1600 ml $H_2O$ | | | | | |
|---|---|---|---|---|---|
| gms CaO per gm Carbon | % Stiochiometric Note A | pH at 74° C. | % Titratable $H_3PO_4$ after additive Note B | % Reduction in Titratable $H_3PO_4$ | $\eta$ % Note C | % Ash |
| Control Sample | — | 1.75 | 5.87 | — | — | 3.87 |
| 0.010 | 19.9 | 2.60 | 3.77 | 35.78 | 179.8 | 2.89 |
| 0.025 | 49.7 | 4.10 | 3.51 | 40.20 | 80.9 | 4.00 |
| 0.050 | 99.3 | 5.15 | 2.73 | 53.49 | 53.9 | 7.33 |
| 0.075 | 148.9 | 5.45 | 1.89 | 67.80 | 45.5 | 7.06 |
| 0.100 | 198.6 | 6.50 | 1.46 | 75.13 | 37.8 | 8.61 |
| 0.125 | 248.3 | 6.40 | 1.79 | 69.51 | 28.0 | 8.89 |
| 0.150 | 298.0 | 6.45 | 1.70 | 71.04 | 23.8 | 8.52 |

TABLE II 20.0 gms Carbon comprising 5.87% H3PO4
Treated With Ca(OH)2 Slurried In 1600 ml H2O

| gms Ca(OH)2 per gm Carbon | % Stiochiometric Note A | pH at 74° C. | % Titratable H3PO4 after additive Note B | % Reduction in Titratable H3PO4 | η % Note C | % Ash |
|---|---|---|---|---|---|---|
| Control Sample | — | 1.75 | 5.87 | — | — | 3.87 |
| 0.010 | 15 | 2.60 | 3.75 | 36.12 | 240.8 | 2.51 |
| 0.025 | 37.6 | 4.25 | 2.92 | 50.26 | 133.67 | 3.41 |
| 0.050 | 75.2 | 5.10 | 2.45 | 58.26 | 77.5 | 6.45 |
| 0.075 | 112.7 | 5.90 | 1.70 | 71.04 | 63.0 | 7.67 |
| 0.100 | 150.2 | 6.60 | 1.46 | 75.13 | 50.0 | 8.56 |
| 0.125 | 187.8 | 6.50 | 1.65 | 71.89 | 38.3 | 8.61 |
| 0.150 | 225.4 | 6.55 | 1.56 | 73.42 | 32.6 | 8.93 |

TABLE III 20 grams Carbon Comprising 5.87%
H3PO4 Treated With Additive Slurried
1600 ml H2O

| Additive | % Stiochiometric Note E | % Additive | % Reduction in Titratable H3PO4 | % Note C |
|---|---|---|---|---|
| MgO | 55.21 | 2.0 | 66.8 | 121 |
|  | 110.44 | 4.0 | 69.2 | 62.66 |
| Mg(OH)2 | 38.2 | 2.0 | 68.1 | 178.3 |
|  | 76.3 | 4.0 | 70.9 | 92.9 |
| Al2O3 | 65.6 | 2.0 | 64.6 | 98.5 |

Table Notes:

A.
$$3CaO + 2H_3PO_4 \longrightarrow Ca_3(PO_4)_2 + 3H_2O$$
168.2 gm mol CaO: 196 gm mol H3PO4

$$\% \text{ Stoichiometric} = \frac{\text{wt. of additive}}{\text{wt. of additive required for stoichiometry}} \times 100\%$$

B. pH titration test

C. $\eta = \frac{S}{R} \times 100\%$ where:

$$S = \frac{\text{wt. of additive}}{\text{wt. of additive required stoichiometry}} \times 100\%$$

R = % Reduction in Titratable H3PO4

D.
$$3Ca(OH)_2 + 2H_3PO_4 \longrightarrow Ca_3(PO_4)_2 + 6H_2O$$
222.3 gm mol Ca(OH)2: 196 gm mol H3PO4

E.
$$3MgO + 2H_3PO_4 \longrightarrow Mg_3(PO_4)_2 + 3H_2O$$
120.9 gm mol MgO: 196 gm mol H3PO4

$$3Mg(OH)_2 + 2H_3PO_4 \longrightarrow Mg_3(PO_4)_2 + 6H_2O$$
174.9 gm mol Mg(OH)2: 196 gm mol H3PO4

$$Al_2O_3 + 2H_3PO_4 \longrightarrow 2AlPO_4 + 3H_2O$$
102 gm mol Al2O3: 196 gm mol H3PO4

The tests of Tables I, II and III were all performed with portions of the same carbon control sample. Such control sample was a representative product of a commercial phosphoric acid activation process following the post activation acid washing step.

After contact with a controlled quantity of additive, the sample was dried in a laboratory furnace at approximately 350° F. over a heating interim of approximately 24 hours. The tabulated data was taken from a reslurried mixture of each sample subsequent to drying.

Review of the Tables I and II data will show that the percentage of H3PO4 residual on the carbon diminished in correspondence with increased applications of additive slurry. This relationship followed until the 0.100 grams additive/gram carbon was reched. Thereafter, the relationship reversed slightly, indicating a point of optimum results.

The increase in % Ash content in the carbon corresponding with a diminution of residual acid reflects conversion of residual acid to insoluble salts.

Of particular note are the Tables I and II data columns for % Stoichiometric and η (reaction efficiency). In Table I, for example, a 19.9% stoichiometric additive charge of CaO provided a 35.78% H3PO4 reduction for an apparent 179.8% reaction efficiency. This analytical disparity illuminates the complexity of the reactions involved. In point of fact, the stoichiometry was calculated as a function of the appropriate reaction formulation given above. In the low pH region, however, it is evident that the generalized reaction formula does not accurately describe the physical occurrence. This impossible reaction efficiency at low pH values, however, reverses in the high pH region so that a 298% stoichiometric additive charge binds only 71% of the available H3PO4 for a reaction efficiency of 23.8%.

The wide range of reaction efficiency, η, is, in more detailed analysis, a function of the acidic carbon solution pH and temperature. As the solution temperature is raised, the reaction efficiency, η, in the low pH range, is increased thereby. Although this particular phenomena, per se, is well known, a manifestation of this phenomena in one commercial mode of practicing the invention is quite surprising.

Following additive contacting, the carbon is drained of residual additive mixture and subjected to drying in an oil or gas fired kiln of approximately 2000° F. at the inlet and 400° F. at the exit. Transit through the drying kiln requires approximately 30 minutes. When the carbon has been contacted with a substantially 100% stoichiometric additive mixture, it has been found that a substantially 98% to 100% stoichiometric acid reduction occurs within the kiln transit interval. Although the residual acid is reduced by only about 50% of the stoichiometric mixture upon drainage and kiln entry, it is evident that sufficient active additive remains on the wet carbon to continue the reaction kinetics after kiln entry. Within the steaming atmosphere of the kiln, the reaction is evidently driven to a mass balance completion consistent with the generalized formulation.

Having fully described by invention,

I claim:

1. A process for producing activated carbon which comprises:

A. saturating a granulated cellulosic source material with phosphoric acid;

B. carbonizing said saturated source material in an activation furnace to produce activated carbon;

C. washing said activated carbon to remove a substantial portion of said acid remaining on said carbon after activation;

D. adding to said washed carbon a sufficient amount of additive material to substantially neutralize such residual phosphate ion remaining on said washed carbon by in situ binding of same as a substantially insoluble salt, said additive material being oxides and hydroxides of elements selected from the group consisting of aluminum, zinc, and the alkaline earth elements; and, E. drying said additive combined carbon at a rate of from ambient to 400° F. in approximately 30 minutes.

2. The process according to claim 1 wherein said cellulosic material is granulated within the size range of 2 to 40 mesh.

3. The process according to claim 2 wherein said cellulosic material is sawdust.

4. The process according to claim 1 wherein said oxide is a member of the group consisting of calcium oxide, magnesium oxide, barium oxide, beryllium oxide, strontium oxide, aluminum oxide, and zinc oxide.

5. The process according to claim 4 wherein said oxide is combined with water as a fluidized mixture which includes an approximately stoichiometric quantity of said oxide required for neutralizing said residual phosphate ion.

6. The process according to claim 1 wherein said hydroxide is a member of the group consisting of calcium hydroxide, magnesium hydroxide, barium hydroxide, beryllium hydroxide, strontium hydroxide, aluminum hydroxide, and zinc hydroxide.

7. The process according to claim 6 wherein said hydroxide is combined with water as a fluidized mixture which includes an approximately stoichiometric quantity of said hydroxide required to neutralize said residual phosphate ion.

8. In a phosphoric acid activation process for producing activated carbon from phosphoric acid saturated cellulosic materials granulated in the size range of 2 to 40 mesh wherein a dominant portion of the phosphoric acid remaining interstitially within pores in said carbon after activation thereof is removed by water washing, the improvement comprising the steps of (a) substantially neutralizing a residual portion of said acid in said carbon by contacting said carbon with a sufficient amount of additive material selected from the group consisting of oxides and hydroxides of alluminum, zinc and the alkaline earth elements, said additive material contacting said carbon as a fluidized aqueous mixture to react with said residual portion of acid to form substantially insoluble phosphate salts that are interstitially bound to said activated carbon, (b) draining said aqueous mixture from said carbon and, (c) heating said contacted carbon to approximately 400° F. in 0.5 hours.

9. The process according to claim 8 wherein said oxide is a member of the group consisting of calcium oxide, magnesium oxide, barium oxide, beryllium oxide, strontium oxide, aluminum oxide, and zinc oxide.

10. The process according to claim 9 wherein said fluidized mixture includes an approximately stoichiometric quantity of said oxide required for neutralizing the desired quantity of said residual portion of said acid.

11. The process according to claim 8 wherein said hydroxide is a member of the group consisting of calcium hydroxide, magnesium hydroxide, barium hydroxide, beryllium hydroxide, strontium hydroxide, aluminum hydroxide, and zinc hydroxide.

12. The process according to claim 11 wherein said fluidized mixture includes an approximately stoichiometric quantity of said hydroxide required for neutralizing the desired quantity of said residual portion of said acid.

* * * * *